Patented Jan. 10, 1939

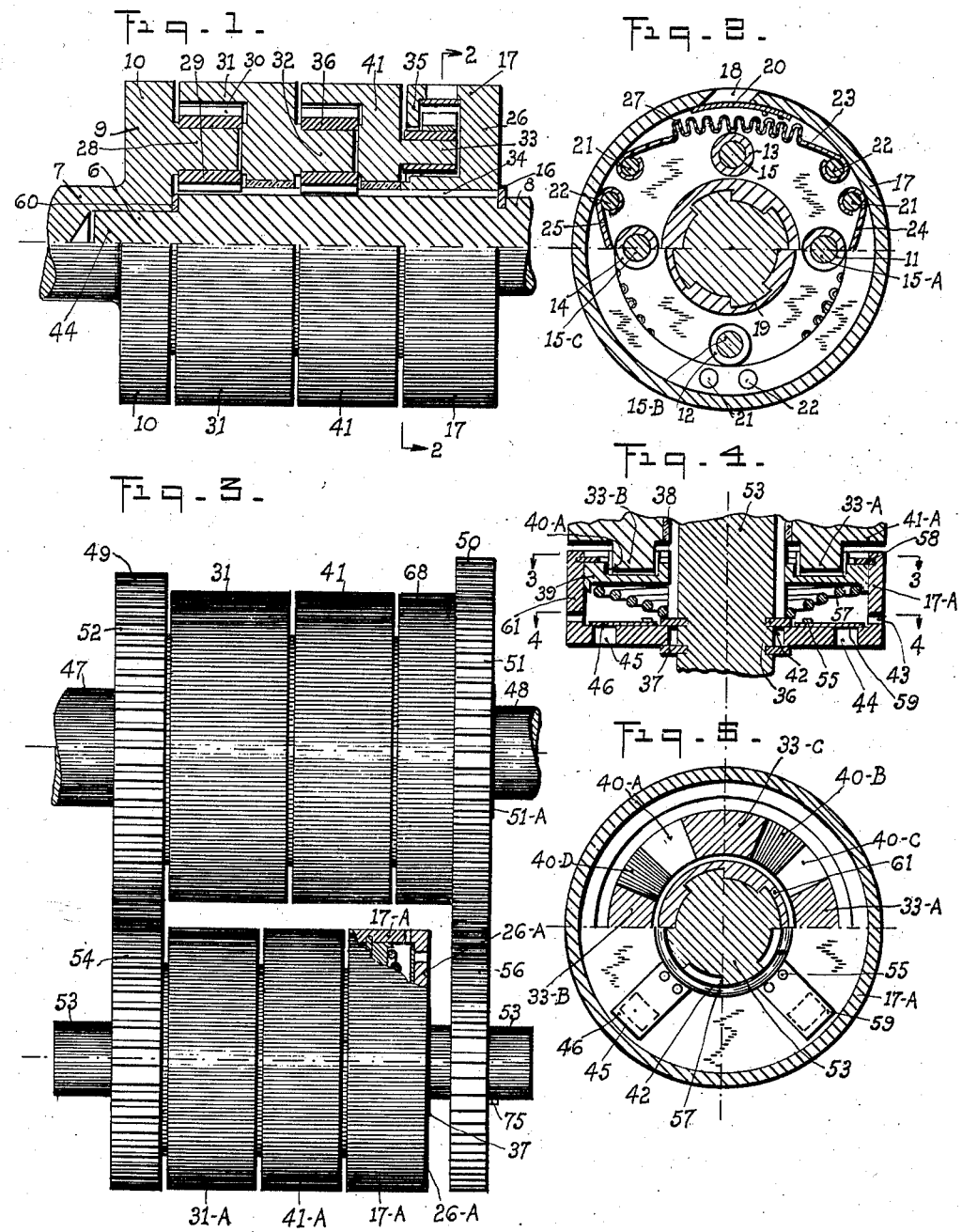

2,143,709

UNITED STATES PATENT OFFICE 2,143,709

VARIABLE SPEED POWER TRANSMISSION DEVICE

Howard J. Murray, New York, N. Y.

Application May 15, 1936, Serial No. 79,825

14 Claims. (Cl. 74—259)

My invention relates in general to an automatic variable speed power transmission device and specifically relates to a device for automatically effecting and affecting speed-torque drive relations between driving and driven members of a power transmission mechanism.

One of the objects of the present invention is to provide a simple form of power transmission mechanism arranged to employ the proper portion of the power transmitted by the driving member so as to automatically effect and affect the speed-torque relations of the driving and driven members.

A further object of the present invention is to provide an automatic speed drive transmission arranged to be automatically controlled in its speed drive relations by slip-drive give-away elements in turn controlled by molecular pressures created as a function of the speed of the driving member and the resistance of the driven member.

An additional object of the present invention is to employ a pressure controlled give-away slip-drive couple to effect and affect the transmission of power from a driving member to a driven member under such conditions that the speed of the driven member may be relatively varied to assume a proper speed-torque drive relation with the driving member.

A still further object of the present invention is to provide a slip-drive give-away couple including elements arranged to produce an in-increase of slip-drive torque with increase of relative speed between the elements.

The present invention is a development of the disclosure included in my U. S. Patent application Serial No. 66,876 filed March 3, 1936 and entitled "Variable speed power transmission with unidirectional clutch", and my U. S. Patent application Serial No. 75,768 filed April 22, 1936 and entitled "Variable speed power transmission device with speed-torque actuated give-away control".

Accordingly the present disclosure includes means for effecting a non slip-drive relation when the driving and driven members are rotating at the same speed and a variable slip-drive relation when the driving and driven members are rotating at different speeds. In one embodiment of the present invention the elements of a slip-drive give-away couple are arranged to rotate at the same speed as the members rotate at different speeds so as to provide universal speed relations. Thus the efficiency of the present device is very high when the elements of the slip-drive give-away couple are rotating at the same speed with the members rotating at the same or different speeds.

According to the present disclosure the control losses are very small compared to the total power transmitted from the driving member to the driven member as the elements of the slip-drive give-away couple rotate at different speeds. This is due to the fact that the give-away slip-drive means is not a friction device, but so formed that power is transmitted by and between the couple elements as a result of molecular resistance and static pressure acting collectively or individually.

While the present invention is obviously capable of use in any location where it is desired to receive power from a driving member, the present invention is particularly applicable to a power transmission mechanism designed for use in connection with automotive construction, and it is in this connection that the embodiments of the present invention will be described in detail.

Various other objects and advantages of the present invention will be in part obvious from an inspection of the accompanying drawing and in part will be more fully set forth in the following particular description of mechanism embodying the present invention, and the invention also consists in certain new and novel features of construction and combination of parts hereinafter set forth and claimed.

In the drawing:

Figure 1 is an embodiment of the present invention partly in vertical section, taken axially of the main shaft; and Figure 2 is a transverse sectional view taken approximately upon the line 2—2 of Figure 1, looking in the direction indicated by the arrows; and Figure 3 is an embodiment of my invention showing a modification of same partly in vertical section, taken axially along the main shafts of same; and Fig. 4 is a vertical sectional view taken axially of the main shafts of Figure 3.

Figure 5 is a transverse section view taken approximately upon the lines 3—3 and 4—4 of Figure 4, looking in the direction indicated by the arrows; and In the following description and in the claims, parts will be identified by specific names for convenience of expression, but they are intended to be as generic in their application to similar parts as the art will permit.

There is shown by Figure 1 of the drawing a novel variable slip-drive give-away couple and associated transmission elements constituting collectively an automatic universal speed transmission mechanism and including a pair of power shafts 7 and 8 disposed in axial alignment with their adjacent ends including the reduced portion 44 of the shaft 8 interfitted to provide proper bearing surfaces.

The power shafts 7 and 8 are mounted for independent rotary movement respectively in suitable bearings (not shown). While either of these power shafts 7 and 8 may be considered as the driving member of the mechanism, for the purpose of this description, it will be considered that the shaft 7 is the normal driving member, and is operatively connected to be driven from a source of power such as an internal combustion engine (not shown).

Accordingly shaft 8 is regarded as the normal driven member, and is operatively connected to what ever mechanism (not shown) it is desired to drive from this follower 8.

The shaft 8 is preferably made of a good quality of steel and formed with teeth or splines 34 to operatively receive a plurality of groups of planet gears 29 forming together with the annular gears 31 and 41 and the teeth a plurality of differential speed drive sets all connected in speed driving relation with the driven member 8, one of the sets (see left hand end set) in driving relation with the driving member 7.

The planet gears are supported and positioned by the integral bearings shown by Figure 1 as elements 28, 32 and 33 of the annular gears 31 and 41 so as to be constantly in mesh with the sun teeth 34, and to rotate therewith. The outer or annular gears 31 and 41 are positioned and supported by the splined bearings in turn positioned by the splines of the member 8.

With this arrangement it is evident that each planet gear is constantly in mesh with portions of the sun teeth 34 and one of the annular gears 31 and 41.

In passing it should be noted that the teeth 34 forming portions of the normally driven shaft 8 are in reality sun gears to be considered as an integral member for the purpose of this description, and that each sun portion is a part of a differential gear set. It is evident that a plurality of separate sun gears could be assembled on the driven shaft 8.

In this event it is obvious that power may be transmitted by and between the power members 7 and 8 by a plurality of power transmission paths, and that each of these paths will act as a means to transmit power in some proportion to the retardation of the rotation of the said differential sets. It is also evident that any retardation of the rotation of the annular gear 41 will be transmitted to the other annular gears.

The annular gear 41 forms a portion of the means providing the supports or bearings 15, 15—A, 15—B, and 15—C for the loosely mounted roller cams 13, 11, 12 and 15. Thus any retardation applied to the cams will be transmitted to the supports 15, 15—A, 15—B and 15—C and thereby the annular gear 41.

A splined member 26 is positioned on the member 8 to rotate therewith. The member 26 is formed with an overhanging flanged portion 35 to receive a plurality of sets of pins 21 and 22 formed to position and support a plurality of resilient members 23, 24 and 25 as shown in Figure 2. The resilient members are positioned so as to be partially in the path of the cammed members 11, 12, 13 and 14 as they are rotated by the splined member 26 about the axis of the shaft 8. A lock ring 16 is fitted in a groove formed in the member 8 to position the member 26 on the shaft 8.

The resilient members 23, 24 and 25 are almost as wide as the recess formed in the member 26 by the end flanged portion 35 so that there will be a small clearance between the members 23, 24 and 25 and the surfaces of the member 26 as the resilient members are moved radially outward by the movement of the said cam members.

In Figure 3 there is shown a modification of the invention shown in Figure 1.

The means shown and supported on the shaft 53 is identical with the means shown on the shafts 7 and 8 of Figure 1, except that the portion 9 of Figure 1 is provided with teeth 54 and loosely mounted on the shaft 53 so as to be driven by the shaft 47 through the teeth 52 instead of directly as in the case of the member 10 of Figure 1. Also the member 26 is provided with teeth 56 and rigidly mounted on the shaft 53 instead of the shaft 8 as in Figure 1. Thus the shaft 53 is in driving relation with the member 68 through the teeth 51. The member 68 is merely a repetition of the member 41 so as to provide an extra set of differential gears.

The parts mounted on the shafts 47 and 48 are also similar to the parts mounted on the shafts 7 and 8 of Figure 1 except that the portion 10 of the member 7 has been provided with the teeth 52 of the member 47, and the portion 26 has been replaced by the member 26—A carrying the axially movable cams as shown by Figures 4 and 5.

Thus the enlarged showings of Figures 4 and 5 show the parts in a section taken axially through the member 26—A. The annular gear member 41—A is provided with the cammed portions 33—A, 33—B, 33—C and 33—D (not shown) formed to co-operate with the mating cam portions 40—A, 40—B, 40—C and 40—D forming portions of the axially shiftable member 39 splined to the shaft 53 and positioned by the lock ring 58 and the tapered spring 57. The member 17—A is splined to fit with the splines of the member 53 and positioned on the member 53 by means of the lock rings 36 and 37. The member 17—A is formed with openings 43, 44 and 45 hereinafter designated as oil holes. Spring valves 46 and 59 are fixed to the member 17—A by means of the rivets 55.

In operation, let it be assumed that the source of motive power (not shown) is connected to the normally driving member 7 of Figure 1 by means of the conventional foot clutch as commonly found on automotive vehicles, altho it is possible according to the present disclosure to operate a vehicle equipped with the present device without any foot clutch.

Let it be further assumed for the purpose of this description that the source of power when connected to the normal driving member 7 will rotate the same clock-wise when viewed from the left end of Figure 1. The device to be driven such as an automotive vehicle is assumed to be connected to the normally driven shaft 8 normally driven in the same direction as the driving shaft 7.

In this event the planet gears 29 and 36 will rotate about their bearings 28, 32 as they revolve about the shaft 8 due to their driving relation with the teeth 34 when the shafts 7 and 8 are rotating at different speeds. The annular gears 31 and 41 will also move clockwise or in the same direction as the rotation of the normally driven shaft 7.

As hereinbefore stated the present disclosure is a development of the invention disclosed in my co-pending application Serial No. 66,876 filed March 3, 1936. The arrangement of the planet gears, annular gears and sun teeth are alike in both applications. Likewise the speed driving relations and the methods of obtaining universal speed drive relations is completely disclosed in this application above noted except rotatable electro-magnetic couple elements are shown in place of the variable give-away slip-drive elements of the present application. It is obvious that no additional teaching will be obtained by duplicating such teaching in this application, insofar as the differential speed drive relations of the gears are concerned.

It will be observed that a differential speed relation between the members 7 and 8 will be maintained at all times. If the members 7 and 8 rotate at the same speed, the member 26 of Figure 1 will also rotate at the same speed. If the member 8 rotates at a lower speed than the member 7, then the member 26 must assume a speed in order to maintain such different relations. As the speeds of the members 7 and 8 vary, the relative speeds of the portions 10 and 17 vary in a definite differential relation to such variation. Thus with a variation in the speeds of the power members 7 and 8, the springs 23, 24 and 25 of Figure 2 will be rotated relative to the cam members 11, 12, 13 and 14. As the springs 23, 24 and 25 are normally in the path of the said cams, it is evident that the said springs must be flexed in order to have relative motion between the portions 10 and 17.

If the cams 11, 12, 13 and 14 do not have sufficient momentum or torque to flex the springs sufficient to pass same there can be no relative motion between the members 10 and 17.

Now let it be assumed that the engine upon the vehicle has been started, and that the conventional foot clutch is "out". Let it be further assumed that the means of Figure 1 is entirely or substantially submerged in a lubricating medium. If the said conventional clutch (not shown) is let "in" the member will be given clockwise motion, and will tend to rotate the normally driven member 8 through the differential sets of Figure 1. But if the member 8 is connected to the vehicle, a resistance will be offered against its rotation and the member 8 will remain stationary. Thus the member 26 must rotate to maintain a differential relation as hereinbefore stated, and if sufficient resistance is offered by the vehicle, the cams 11, 12, 13 and 14 and the springs 23, 24 and 25 of Figure 2 will be given relative motion. But this relative motion can only occur as the springs are moved out of the path of the said cams.

It should be noted that the give-away slip-drive couple formed by the springs 23, 24 and 25 and the cams or rollers 11, 12, 13 and 14 of Figure 2 is not a friction device. The contact-surfaces may be smooth and the parts made of steel, and in addition the parts may be continually immersed in oil or some lubricating medium. In addition the areas may be provided very large by axial increase in width, and thus the unit pressures very small, and with large radiating areas. The rotating radius of the springs and the rollers are not limited, and thus the device may be designed so that the torque relations of the slip-drive couple are very much smaller than the torque relations given the members of the differential drive sets.

The give-way slip-drive couple of Figure 2 is therefore a non-friction torque transmitting device, and the springs and the rollers may move into and out of slip and non-slip relations as a function of the speed of the member 7 (when driving) and the resistance of the member 8 (when driven).

With the member 7 rotating and the member 8 held stationary by its connected load, the rollers will continue to move with the member 7, and the springs and the associated member 17 will be held stationary because of its splined relation with the member 8. Thus the springs will tend to retard the rollers and power will be transmitted from the rollers 11, 12, 13 and 14 if the member 8 is moving at all. If the member 8 remains stationary, the rollers in effect will be retarded, and this retardation will be transmitted to all the differential sets as clearly explained in the above co-pending U. S. application.

It should now be noted that the end member 17 is provided with an oil opening 18 and an associated spring valve 20 fastened to the member 17. As the springs 23, 24 and 25 are moved radially by the rollers 11, 12, 13 and 14 they become in effect pistons. It will be seen by reference to Figure 1 that the springs move within the recess formed in the member 17 so that only a small clearance remains between the springs and the sides of the said recess. Thus when the spring moves downward a suction is created which operates to open the spring 20 and suck in some of the surrounding oil or lubricating medium in which the device is submerged. When the rollers move the springs radially outward a pressure is created which acts to close the spring 20 and force the oil between the springs and the sides of the member 17. Thus the oil acts to aid the spring resistance in opposing the passing of the rollers. But the pressure in the oil which causes torque to be transmitted by and between the springs and the rollers is a static pressure. The less the movement of oil the greater the pressure, and thus the static pressure acts to cause the driving member 7 to drive the driven member 8 with a high degree of efficiency as compared to the conventional pumping action wherein liquid is moved with the accompanying molecular friction and consequent loss.

The smaller the interval of time (for a given set of conditions) the greater the static pressure developed in the practically closed chamber formed by the springs and the member 17. Thus the greater the difference of speed between the members 7 and 8 the greater the opposition offered by the relative movement of the springs and the rollers. Of course, the greater the pressure created in the chamber, the faster the oil will be forced through the clearance between the springs and the sides of the member 17, but investigation will show that the decreased time interval will tend to offset much increase.

If the retarding torque is not sufficient to start the member 8, then the operator of the vehicle will accelerate the engine (not shown) to increase the relative speed between the springs and the rollers to thereby increase the torque relations of same. Eventually the member 8 under normal conditions will be rotated. As the speed of the member 8 increases the relative speed of the members 10 and 26 will decrease under normal operating conditions, because the torque resistance of the member will decrease as it increases in speed under normal operating conditions.

When the speed of the member 8 has reached the speed of the member 7 all the normally rotating parts shown in Figures 1 and 2 will all be rotating at the same speed. There will be no relative rotation between the springs, rollers or any of the parts, and thus the highest possible transmitting efficiency will be obtained. When all the parts are rotating at the same speed a condition of direct drive is obtained as long as the load resistance of the driven member 8 does not exceed that value required to force the springs and the rollers out of a non-slip drive relation.

It should also be noted that under conditions of a non-slip relation between the springs and the rollers, no pressure will be created in the oil in the spring chamber. Thus the torque relations between the springs and the rollers is a function of the resistance of the driven member and the speed of the driving member, and in general the magnitude of the spring-roller torque increases with increase of difference of speed between the normally driving member and the normally driven member.

It is obvious that a greater torque must be applied to cause relative motion between the springs and the rollers than to maintain a non-slip relation, and that a non-slip drive is in effect a positive drive between the members 7 and 8.

In actual operation the torque-speed relations of the members 7 and 8 are constantly changing. Member 8 may be the driven member one instant, and member 7 the driven member the next instant. In addition, the size and number of differential sets may be varied, the size and number of springs and rollers may be varied, and thus a specific set of conditions would be of no value in this description. In general, however, according to the present disclosure the frictional loss created in the couple including the roller and spring elements may be made very small compared to the power transmitted by and between the members 7 and 8.

Under normal driving by the member 7, then the resistance of the member 8 is increased (car starting up grade) the member will fall back in speed, and this action will increase the relative speed between the rollers and the springs to increase the torque relations as hereinbefore explained until a speed-torque balance is established between the members 7 and 8. Thus the slip-drive give-away couple act automatically to effect a speed driving relation between the members 7 and 8 as a function of the resistance of the driven member and the speed of the driving member. This is possible because the torque relations of the springs and the rollers increase automatically in synchronism with the increase of resistance of the driven member to react on the differential sets to increase the retardation of same to cause the said sets to act to cause the driving member to drive the driven member.

When the member 8 becomes the driven member, the member 26 will be rotated counter-clockwise as described in my co-pending application above noted. All of these relative motions between the members 7, 8 and 26 may be seen by reference to Figure 6 of my co-pending application Serial No. 66,876 filed March 3, 1936.

According to the present disclosure the percentage of the total power transmitted through the path division formed by the springs and the rollers of Figures 1 and 2 and thus the torque relations of the same decreases as the number of differential sets is increased. Let it be assumed that with one set of differential elements, one-half of the total power would be transmitted through the elements of the said couple, then with two differential sets only one-fourth of the power would be so transmitted. With the arrangement shown by Figures 1 and 2 only one-eighth of the total power would flow through the said couple. An additional set would decrease the said power to one-sixteenth. Thus there is no limit to the percentage required for controlling the power through the differential sets from the driving member to the driven member. Theoretically the control power required may approach zero value, actually it is determined by practical limitations. Without any differential set all the power would have to pass between the springs and the rollers, and according to the present disclosure this is possible, but the losses would increase as well as the size and capacity of the springs and the rollers. Thus the torque created between the springs and the rollers of Figures 1 and 2 may be made very small compared to the torque forces between the members 7 and 8 with a corresponding decrease in the power transmitted by and between the said rollers and said springs, and also with an increase in the sensibility of control of the speed driving relations of the members 7 and 8.

In Figure 3 there is shown a method of still further decreasing the percentage of the power and torque required for variable speed control between the members 7 and 8 of Fig. 1.

In effect the means of Figures 3, 4 and 5 constitute a duplication of the means of Figure 1 to provide still a more sensitive slip-drive give-away control couple for the transmission of power between the members 7 and 8. In the main or upper path all the differential sets are in driving relation with the normally driven member and with each other, one set in driving relation with the normally driving member. In the second or lower path the elements mounted on the shaft 53 are differential sets all in driving relation with the shaft 53 and with each other, one of the sets is in driving relation with the normally driving member by means of the teeth 52 and 54, and the shaft 53 is in driving relation with one of the upper differential sets by means of the teeth 59 and 56. The last power division path is formed by the slip-drive give-away couple including the rotatable cams 40—A, 40—B, 40—C and 40—D of Figures 4 and 5 and also the cams 33—A, 33—B, 33—C and 33—D of the same figures. It should be noted however that the cams 40—A, 40—B, 40—C and 40—D are not resilient as are the springs 23, 24 and 25 of Figures 1 and 2, and that the torque relations created between the cams of Figures 4 and 5 depends on the pressure created in the lubricating medium alone. When relative motion is given the said sets of cams due to relative motion between the members 41—A and 17—A the cams 40—A, 40—B, 40—C and 40—D forming projecting portions of the axially shiftable member 39 are axially reciprocated against the resistance of the spring 57.

Thus oil will be forced out of the openings 43 due to the pressure created in the inclosure formed by the members 17—A and 39. This pressure will also act to close the spring valves 46 and 59 to prevent the said oil flowing through the larger openings 45.

When the member 39 and the cam projections attached to same move toward the member 41—A suction will open the valve elements 46 and 57 and permit the oil to be sucked into the oil chamber. Thus the oil can flow into the chamber easier than it can flow out, as the openings 43 and 45 combined provide a much larger opening than the openings 43 alone. While a spring 57 is provided as a means for returning the cams 40—A, 40—B, 40—C and 40—D so as to be constantly in co-operative association with the cams 33—A, 33—B, 33—C and 33—D of the member 41—A, it is understood that this spring is not used in the same manner as the springs 23, 24 and 25 of Figures 1 and 2. The spring 57 is primarily to return the member 39 and its associated cams.

But the elements supported by the shaft 53 is a control for the differential set including the annular gear 68 in turn a control for the differential sets including the annular sets designated on Figure 3 by the numerals 31 and 41. As hereinbefore stated the set designated as 68 requires only one-eighth of the power passing through the power transmitting path supported by the members 47 and 48 of Figure 3. As three differential sets are supported (or may be supported) on the shaft 53 then as hereinbefore stated only one-eight of the power passing through the power path supported by the shaft 53 will flow through the slip-drive give-away cam elements of Figures 4 and 5, and thus only one-eight of the power transmitted by the gears 56 to the gears 50 will be normally needed as the maximum amount or percentage of the power flowing through the said path.

Thus only one-eighth of one-eighth or one sixty-fourth of the total power transmitted from the member 7 to the member 8 will under maximum control power conditions flow through the slip-drive give-away elements of the control couple of Figures 4 and 5. If only one additional differential set be added to each of the shafts 48 and 53 of Figure 3, it is obvious that only one-sixteenth of one-sixteenth or one two-hundred-and-fifty-sixths of the total power transmitted from the driving member to the driven member will have to pass through the slip-drive give-away control couple.

If the gear 51 is provided with more teeth than are included on the member with teeth 56 (or less) it is obvious that overspeed drive relations may be effected and affected between the members 7 and 8 (or between members 48 and 53) as the couple elements rotate at the same speed. Thus may also be varied by making the gears 54 and 56 much larger than the gears 49 and 50 so that the elements supported on the shaft 53 rotate at much slower speed than the elements mounted on the shafts 47 and 48.

In conclusion, it will be understood that the present disclosure provides means for automatically effecting and affecting variable speed driving relations between a driving member and a driven member as a function of the resistance of the driven member and the speed of the driving member. That means are provided for employing a small portion of the power transmitted between two power members to control the variable speed transmission of said power in an automatic manner. That means are provided for increasing torque relations between elements of a slip-drive give-away couple as the relative speed of the said elements is increased. That means are provided whereby pressure and resistance may be employed in a more or less static manner to separately and collectively cause the transmission of power by and between power members.

While I have shown and described and have pointed out in the annexed claims certain new and novel features of my invention, it will be understood that certain well known equivalents of the elements illustrated may be used, and that various other substitutions, omissions and changes in the form and details of the devices illustrated and in their operation may be made by those skilled in the art without departing from the spirit of my invention.

Having thus described my invention, I claim:

1. A torque controlled slip-drive pumping device for connecting a driving member and a driven member, comprising a main power transmitting path including axially positioned differential drive sets connected to each other, one of the said sets connected to one of the members and all the sets connected to the other member, a rotatable slip-drive couple including a resilient resisting element connected to one of the members and a rigid element connected to one of the sets to form a variable enclosure with portions of the said set, and liquid means positioned within said enclosure and arranged to tend to be compressed according to the movement of the said resilient means to thereby resist said movement and thereby varying the torque driving relations of the said elements as a function of the speed relation of same.

2. A variable pressure pumping device for associating power members in drive relations, constituting means providing differential drive sets each connected to one of the members and to adjacent sets, one of said sets connected to the other member, a rotatable slip-drive couple including an element resiliently connected to one of the sets and a rigid element connected to one of the members, and liquid means rotatable with the resiliently connected means so as to tend to be compressed by the relative rotation of the said elements proportional to the magnitude of said relative rotation and thus vary the slip-drive resistance of the said elements.

3. An automatic variable speed power transmission mechanism including a driving member, a driven member and a slip-drive organization positioned between said members, said organization normally partly suspended in oil and including means constituting a plurality of progressively divisible power transmitting paths including a plurality of driving sets and a rotatable control couple constituting a slip-drive device provided with a variable volume enclosure and a portion of said oil positioned within same, said couple and said sets associated with each other so as to derive pressure control power from said members whereby the torque required to move the said couple elements relative to each other against the compression resistance of the said oil is a function of the number of sets in both paths, the rate of oil pressure change and the relative amount of oil in the said enclosure.

4. The combination of a driving member and a driven member, means including differential drive sets each in driving relation with one of the members and with each other, one set in driving relation with the other member, clutching means including elements constituting an oil pump connected to one of the members and one of the sets, and oil valve means for increasing the oil pump action and thus the torque relations of the clutching means with increase of relative speed of the said elements.

5. In an automatic speed changing power transmitting mechanism, the combination of driving and driven power members, a multi-path driving connection therebetween, said connection including means constituting a main power trasmitting means and a control power transmitting means, each power transmitting means including differential drive sets each in driving relation with one of the members and with adjoining sets, one set of each power transmitting means in driving relation with the other member, one set of the control means connected to a slip-drive couple including an actuating element connected to one of the sets and an actuated element connected to one of the members, and means constituting a liquid medium compressed by the said actuated element and positioned in an enclosure formed by one of the members and the said actuated element for increasing the slip-drive resistance of the said couple with increase in pressure within the said liquid due to an increase in relative speed between the said power members.

6. A variably resistant slip-drive device normally in a positive drive status for connecting a driving member and a driven member in drive relations, including gear sets arranged to provide progressively divisible power transmitting paths between the said members, and a bidirectional slip-drive couple including rigid and flexible elements normally in positive drive relation and constituting the last power transmitting path division, said couple including in addition liquid means positioned to acquire pressure from the said flexible element during relative movement of the said elements to resist said relative movement in proportion to its magnitude to vary the said slip-drive action to cause the said elements to move to and from the positive drive relation.

7. A pressure controlled device for effecting and affecting universal drive relations between a driving member and a driven member, constituting means comprising series-multiple power transmitting paths between said members, one of the said paths formed with a recess portion and including differential drive sets arranged in driving relation with the driven member and to each contiguous set, one of the said sets in driving relation with the driven member, a second path including sets each arranged in driving relations with one of the sets of the first named path and to each contiguous set, one of the said second path sets in driving relation with the driving member, a non-frictional slip-drive clutch couple including an actuator element in driving relation with one of the sets of the second named path and an actuated element in driving relation with the driven member to act with the said recess to form a variable volume enclosure, a lubricant surrounding the said couple and also positioned within the said enclosure, said actuated element positioned within said recess so as to admit said lubricant to said enclosure when relatively moved in one direction and thereafter impart a pressure to same when actuated by the said actuator element in the opposite direction, said pressure acting to resist the slip-drive action of the couple.

8. A universal give-away device for universally relating driving and driven members approximately surrounded by a lubricating medium, comprising differential drive sets normally in axially progressive speed driving relation, a universal give-away control couple constituting an accumulative control couple constantly submerged in said liquid and including a rotatable element associated with one of the members and a second rotatable element associated with one of the sets so as to be retarded in its relative movement with the other element by the accumulative action thereby to act to cause all the said sets to approach the same speed, and a liquid valve element attached to one of the sets and actuated by the said action of the elements as a function of the give-away action.

9. An oil compressing slip-drive device for effecting universal driving relations between driving and driven power members, comprising differential sets each connected to one of the members and to other sets, one of the said sets in driving relation with the other member, and an oil compressing slip-drive couple actuated by power received from the said members arranged to act to tend to compress the oil against its resistance as a function of their difference in speed to retard the couple to a positive drive relation and thereby cause the members to approach the same speed.

10. A device for effecting and affecting drive relations between driving and driven power members in accordance with liquid pressure created by power taken from the said members, constituting rotatable give-away pressure controlled elements normally in positive drive relation, and means constituting a partially closed portion formed in one of the members and associated with one of the elements to become a variable volume enclosure as the elements are moved relative to each other to compress the medium within the said enclosure by the action of power derived from the members.

11. A variable speed power transmission including a driving member and a driven member and a normally positive resistant member, said resistant member including a plurality of differential gear sets arranged in a series multiple power path relation each set connected to the driven member and to adjacent sets, one set connected to the driving member, and means constituting a slip-drive pressure pump for causing one of the sets to continuously receive control power from the driving member through all the sets so as to continuously effect driving relations between the said members.

12. A variable speed power transmission including a driving member and a driven member and a resistant member, said resistant member including a plurality of differential gear sets arranged in a series multiple path relation, and means constituting a rotatable pressure pump for causing one of the sets to actuate said pump thereby to receive resistant control power from one of the members in an increasing ratio relative to increase of difference in speed between said members.

13. A variable speed power transmission including a driving member, a driven member and a resistant member therebetween positioned for rotation about a common axis, said resistant member including gear elements arranged in a multiple series power path relation in a lubricant, and means including rotatable elements symmetrically positioned about said axis and movable relative to each other for causing said elements to create resisting action on a portion of said lubricant and thereby derive control power from the members proportional to the frequency of the relative movement of the said elements.

14. A variable speed power transmission including a driving member, a driven member and a resistant member therebetween, said members mounted for relative rotation about a common axis, said resistant member including gear sets arranged symmetrically about the said axis in a series multiple power transmitting path arrangement, means including rotatable elements movable relative to each other and symmetrically positioned about the said axis, and liquid means positioned relative to said elements so as to be compressed by said relative movement proportional to the frequency of said movement to thereby increase the control power transmitted from one element to the other during said compression action proportional to said frequency.

HOWARD J. MURRAY.